P. J. DARLINGTON.
MILLING MACHINE.
APPLICATION FILED APR. 30, 1919.
1,341,300.
Patented May 25, 1920.
6 SHEETS—SHEET 2.
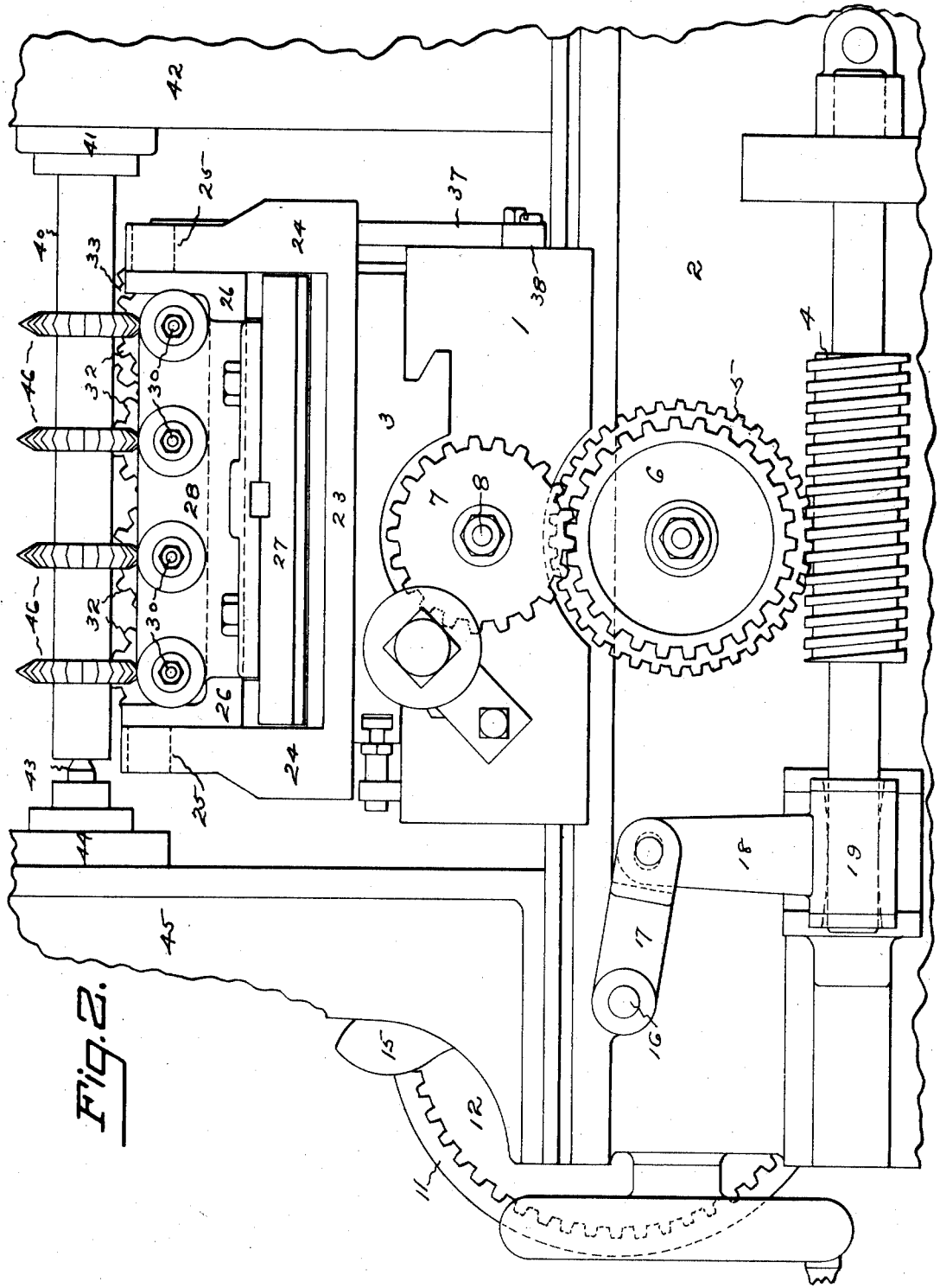

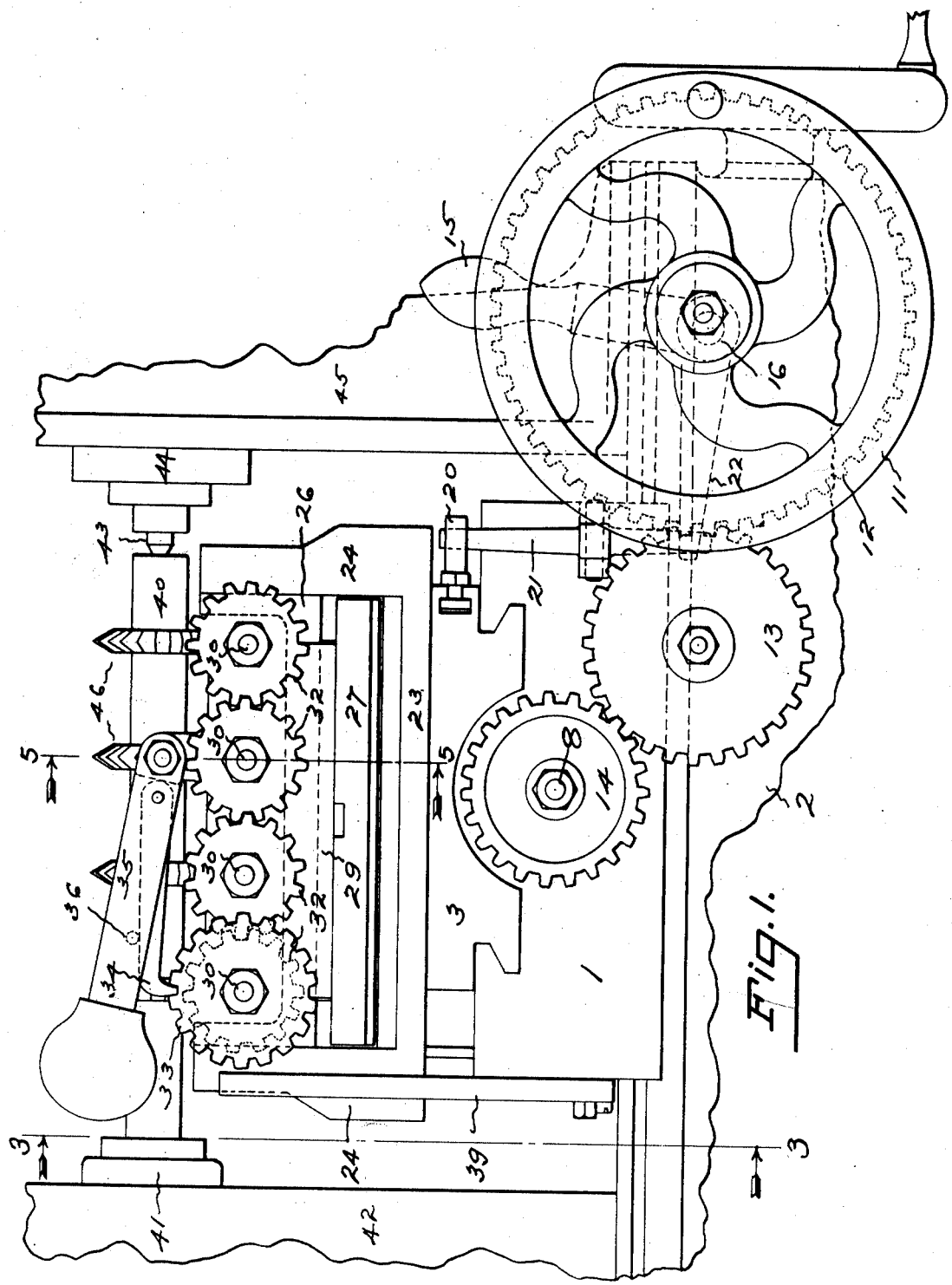

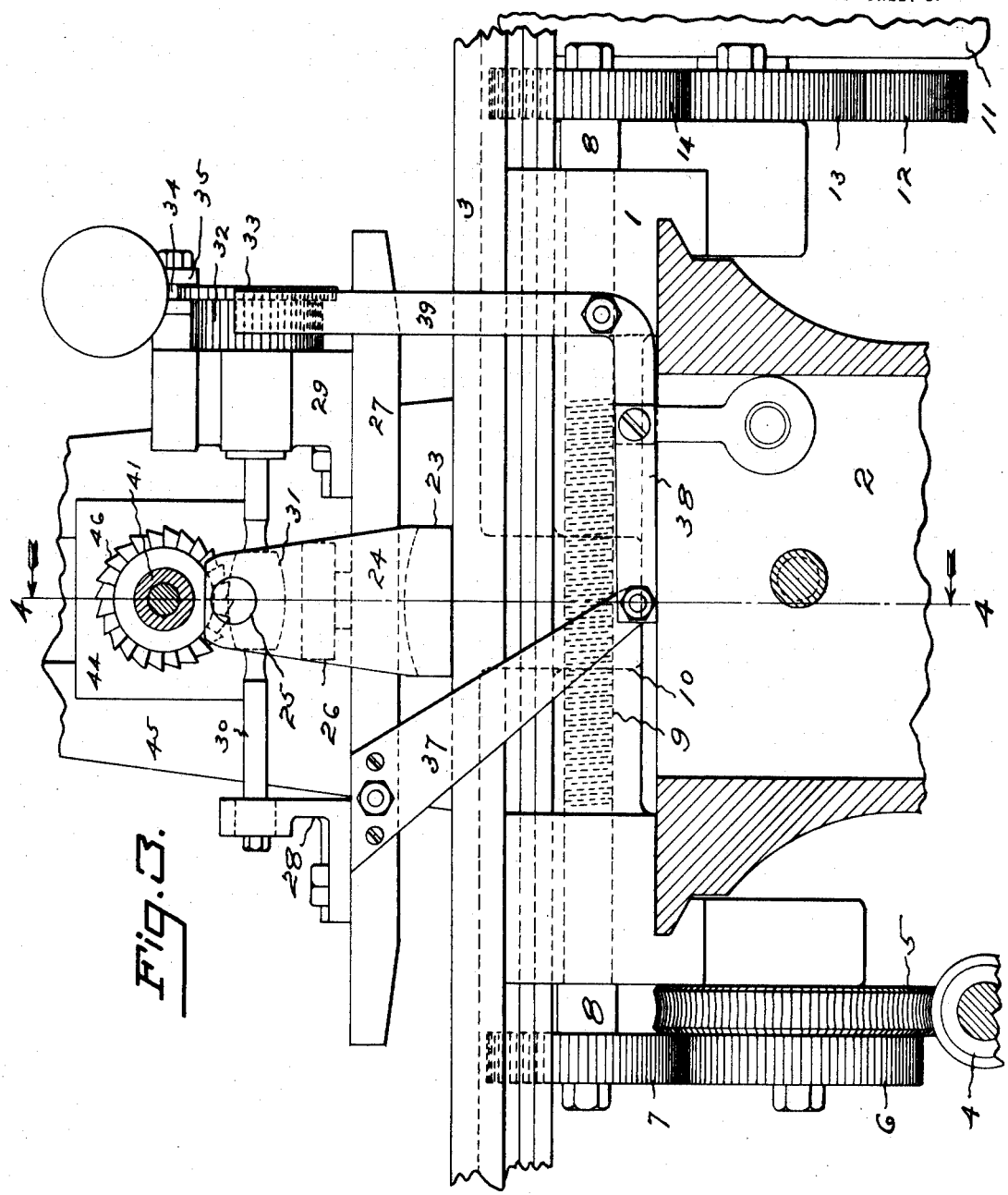

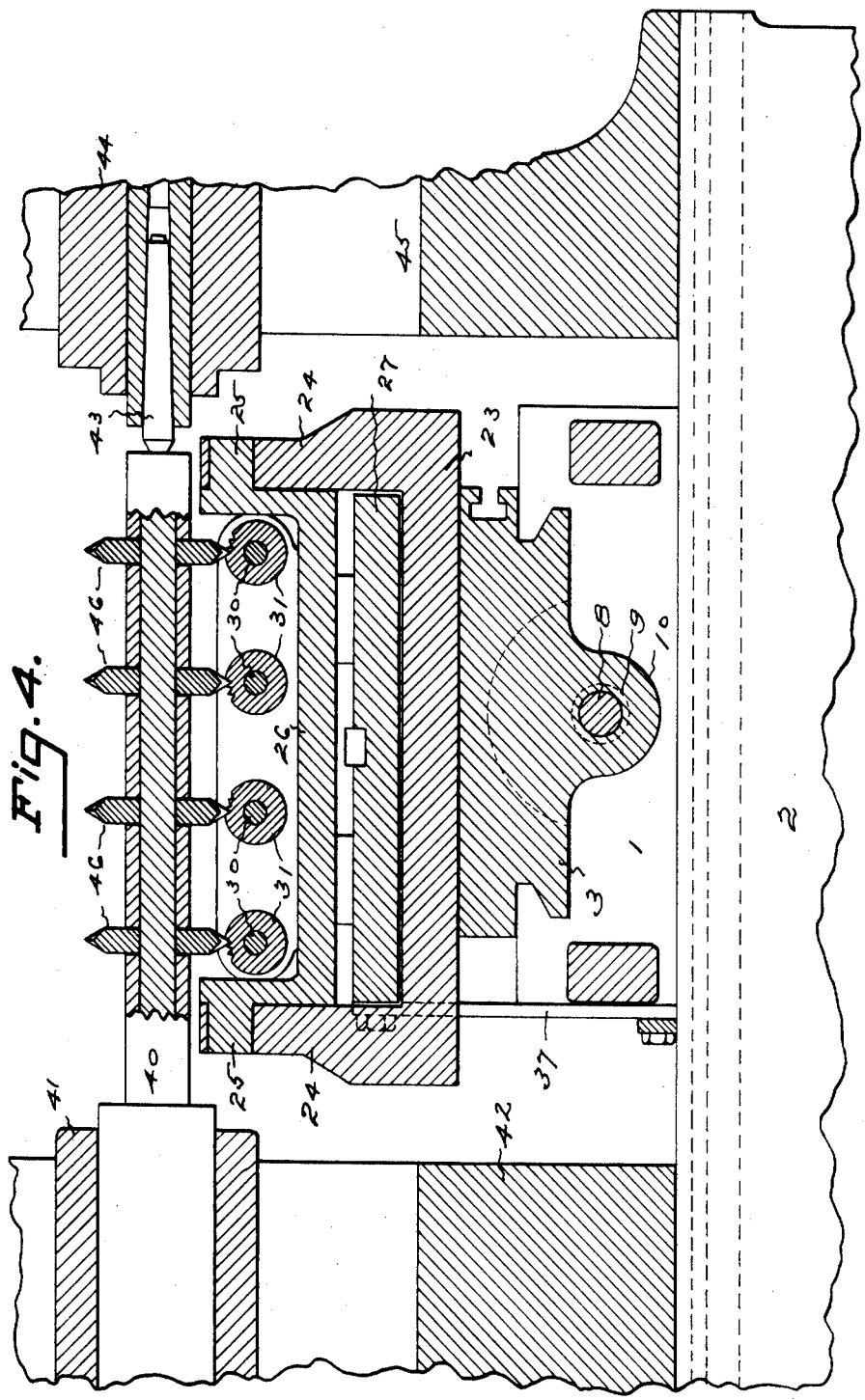

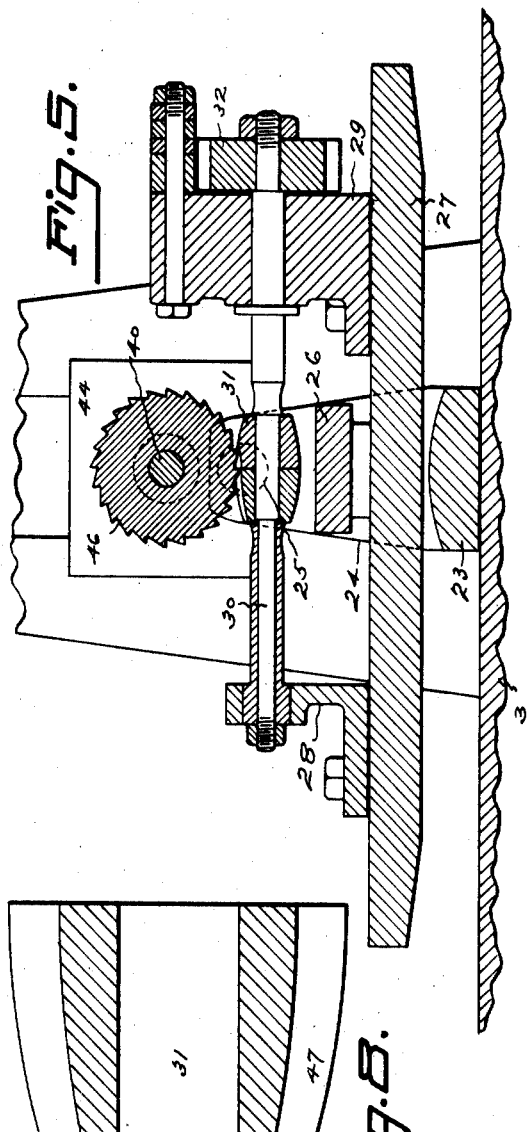
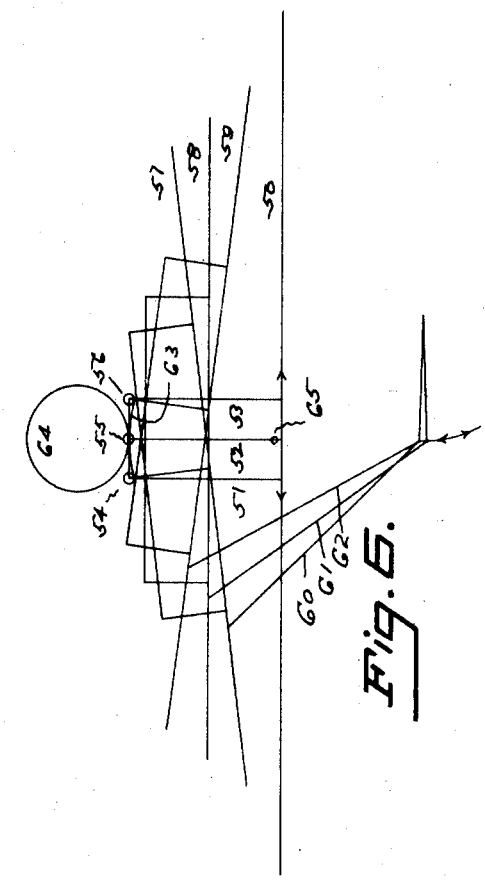
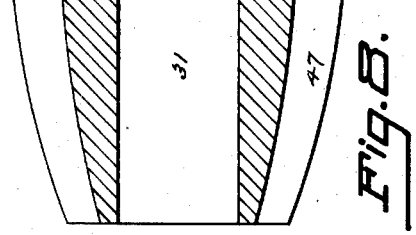
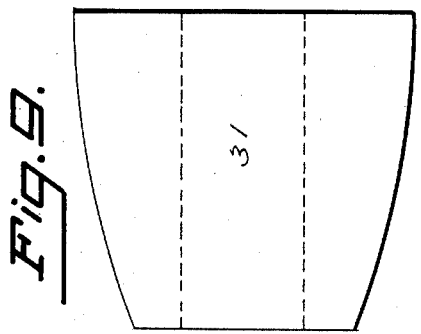
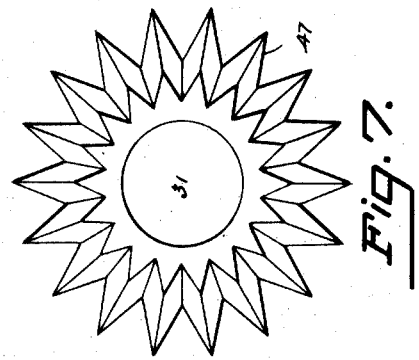

P. J. DARLINGTON.
MILLING MACHINE.
APPLICATION FILED APR. 30, 1919.
1,341,300.
Patented May 25, 1920.
6 SHEETS—SHEET 6.
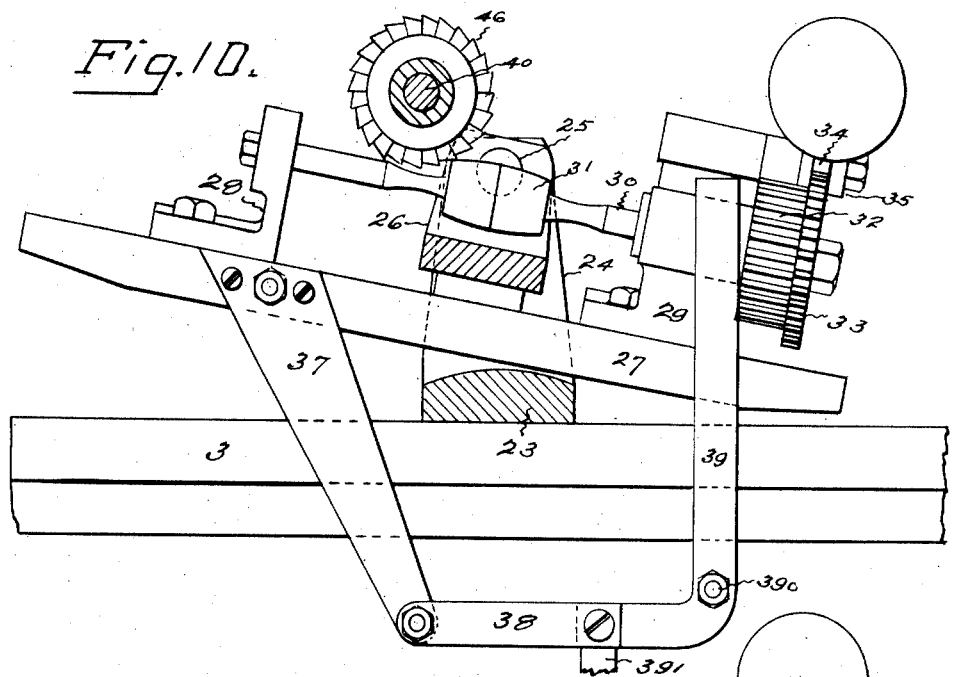
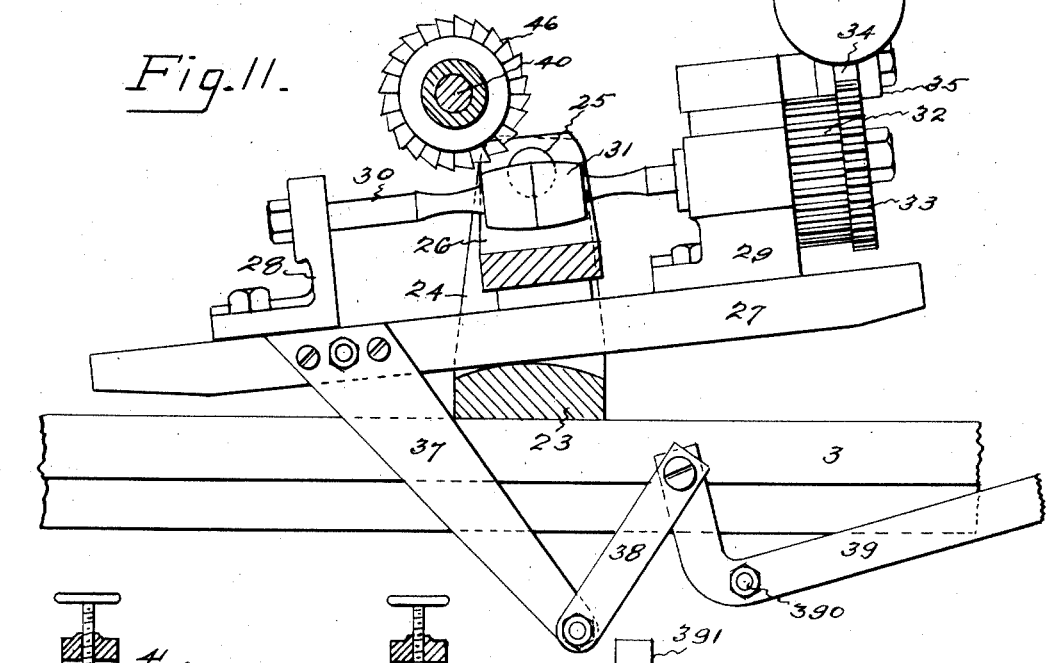
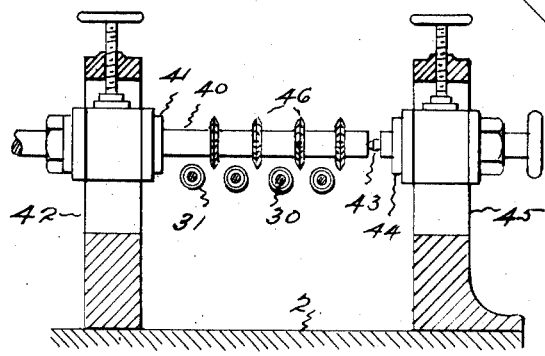
Inventor
Philip J. Darlington
Harry R. Williams
Attorney

UNITED STATES PATENT OFFICE.

PHILIP J. DARLINGTON, OF HARTFORD, CONNECTICUT, ASSIGNOR TO THE ROTO COMPANY, OF HARTFORD, CONNECTICUT, A CORPORATION OF CONNECTICUT.

MILLING-MACHINE.

1,341,300.        Specification of Letters Patent.        Patented May 25, 1920.

Application filed April 30, 1919. Serial No. 293,590.

*To all whom it may concern:*

Be it known that I, PHILIP J. DARLINGTON, a citizen of the United States, residing at Hartford, in the county of Hartford and State of Connecticut, have invented a new and useful Improvement in Milling-Machines, of which the following is a specification.

This invention relates to the type of milling machines which are designed for forming curved teeth on the edges of disks or sides of cylinders. The machine illustrated and described herein is more particularly adapted for forming the teeth of crown or acorn shaped cutters which are used for removing deposit from the interior of boiler tubes, although the machine is applicable for cutting teeth on other articles.

The object of the invention is to provide a milling machine with novel mechanisms and attachments which are so constructed, arranged and adjustable that any required number of teeth of the desired depth and contour may be rapidly cut upon easily and accurately formed blanks of various sizes and outlines by ordinary, cheaply made, quickly sharpened, and correctly set milling cutters, thus enabling large quantities of toothed articles of the size and shape desired to be produced at a small cost with little strain on the mechanisms.

This object is attained by fastening the milling cutter upon a rotatory spindle which is mounted in bearings that are stationary during the operation of the machine but that can be adjusted toward and from the blank for varying the depth of the cut. The blank to be cut is fastened to an arbor provided with indexing means for turning it step by step after each cut, and the arbor and index are held by bearings in brackets mounted upon a tilting-table. The table is attached to a swinging frame hung upon trunnions supported by pedestals mounted upon a slide that is movable longitudinally with relation to the line of cut and is on a carriage which is adjustable on the bed of the machine transversely of the line of cut. The axis of the trunnions passes through the point of cut, and the tilting-table is pivotally connected with the carriage at such a point that the table is oscillated and the blank carried beneath the cutter on a curved path, the center of which is intermediate the axis of the trunnions and the point of pivotal connection of the table with the carriage, as the slide moves back and forth.

In order to increase the capacity of the machine and thus cheapen the product, four milling cutters are mounted upon the single rapidly rotated cutter spindle, and two blanks placed back to back are fastened upon each of four blank arbors that extend parallel with each other and at right angles to the cutter spindle, the blank arbors being geared together and controlled by a single indexing means. Such a machine which operates upon eight blanks at each setting is illustrated in the accompanying drawings.

Figure 1 shows a front elevation of the essential elements of the machine.

Fig. 2 shows a rear elevation.

Fig. 3 shows a transverse vertical section on plane denoted by line 3—3 on Fig. 1.

Fig. 4 shows a longitudinal vertical section on plane denoted by line 4—4 on Fig. 3.

Fig. 5 shows a transverse vertical section on plane denoted by line 5—5 on Fig. 1 with the parts in the positions occupied when the milling cutter has milled about one half of a milling cut in two blanks placed end to end.

Fig. 6 is a diagram representing the movement of the parts while the blanks are being cut.

Fig. 7 shows an enlarged face view of a cutter formed on this machine.

Fig. 8 shows a section of the cutter.

Fig. 9 shows a side view of a blank from which the cutter is formed.

Fig. 10 is a transverse vertical secton of parts on the same plane as Fig. 5 showing the mechanisms in the positions occupied when a milling cutter is about to commence milling two of the blanks placed end to end.

Fig. 11 is a view similar to Fig. 10, with the mechanisms in the positions occupied when the blanks are tilted away from the milling cutter so that they are free to be indexed.

Fig. 12 is, on reduced scale, a side elevation of the milling cutter spindle and its bearings, with the bearing frames in section, illustrating the means for adjusting the milling cutter spindle bearings for varying the depth of cut, also showing the relative positions of the cutters and blanks when the blanks are first placed upon their arbors.

The improvement is adapted to a milling machine of common type, consequently, details of the construction of the frame and driving mechanisms, which are well known, are not shown and specifically described.

The carriage 1 of the machine is movably mounted in the customary way upon the top of the bed 2 and is designed to be adjusted from side to side by the ordinary mechanisms. Movable from front to back on the top of the carriage is a slide 3. This slide is adapted to be moved backward automatically by the usual mechanisms mounted at the back of the carriage and consisting of worm screw 4, worm wheel 5, gear 6, and pinion 7 which is fixed on the rear end of the shaft that has a feed screw 9 which passes through a threaded boss 10 projecting downward from the under side of the slide. The slide may be moved forward by the ordinary mechanisms mounted on the front of the carriage and consisting of a hand wheel 11, gear 12 that is attached to the hand wheel and meshes with the gear 13 which is in mesh with the pinion 14 on the front end of the feed shaft 8. The worm screw 4 may be disengaged from the worm wheel 5 by means of the lever 15 mounted at the front on the end of a rock shaft 16 that at the back has a rocker 17 connected with an arm 18 projecting upward from the sliding bearing 19 at one end of the worm wheel arbor. The lever 15 may be thrown by hand or automatically by the engagement of the stop pin 20 projecting from the slide with a trip lever 21 which engages with the trip arm 22 extending from the rock shaft 16, which mechanisms are of ordinary construction.

On the top of the slide and extending transversely across it a plate 23 is fastened, and extending upward from each end of this plate is a pedestal 24. Near the upper ends of the pedestals are bearings into which extend trunnions 25 that project outwardly from the upper ends of a depending yoke frame 26 which is free to swing toward the front and rear on the trunnions thus supported by the pedestals on the slide which is movable toward the front and rear. Fastened to the under side of the swinging frame is a table 27. On this table, near the rear end, is an upstanding bracket 28, and on the table, near the front end, is an upstanding bracket 29. These brackets contain bearings for the ends of the blank-carrying arbors 30 upon which the blanks 31 to be cut are mounted, preferably two previously formed blanks being arranged back to back on each arbor. At the front the blank arbors are provided with gears 32 that intermesh in such manner that the arbors and blanks thereon may be turned coincidentally. On the front end of one arbor a notched index wheel 33 is fastened, and adapted to engage this index wheel and turn it one step at the desired time is a pawl 34 which is mounted on a weighted lever 35 that is pivoted to the front bracket in such manner that when the lever is lifted, the pawl is drawn out of one notch in the index wheel and moved back to the next notch, and then when the lever is dropped or pressed down, the pawl being held down by a pin 36 projecting from the lever, engages the wall of the notch it has entered and pushes the index wheel one space so as to turn all the blanks one step, these steps usually being equivalent to the spaces between the teeth of the cutters to be formed. Fastened to the table is an arm 37 that extends downwardly and at its lower end is jointed to a link 38 which is connected with the end of an angle lever 39 that is attached by the pivot 390 to the side of the carriage. When the front or handle end of this angle lever is turned upright and its lower end rests on the stop block 391, the link retains the lower end of the arm substantially fixed, and under these conditions as the slide moves back and forth, the table hung on the swinging frame that is mounted on the pedestal on the slide, oscillates up and down as it moves back and forth with the slide.

The cutter spindle 40 is supported at one end by a bearing 41 that is vertically adjustable in the usual way in the upright frame 42 and it is supported at the other end by a center 43 in a bearing 44 that is vertically adjustable in the usual way in the upright frame 45. In the form of machine shown, four properly spaced milling cutters 46 are mounted on this spindle which has the usual means for giving it the necessary rotation.

The blanks 31 to be milled are mounted face to face on the arbors on opposite sides of the plane passing through the center line of the trunnions when the carriage is adjusted so as to carry the arbors to one side of the milling cutters. After the carriage is adjusted to carry the blanks below the milling cutters and the milling spindle has been adjusted to give the proper depth of the cut of the milling cutters into the blanks, the automatic feed for the slide is thrown in. This causes the slide to move backward and carry with it the swinging frame that supports the table which carries the arbors, blanks and indexing mechanism, and as the arm restrains the table, the table and all it carries rocks while moving backward.

The result of these motions is that the surfaces of the blanks on the spindles, which are held by the brackets on the table, are caused to travel in a curved path and the center of this curve is approximately midway between the axis of the trunnions which support the frame that carries the table and the pivotal point of the arm with the link which causes the table to oscillate as it is moved back and forth.

The milling cutters, therefore, mill curved teeth 47 on the surfaces of the blanks, the radius of which teeth are approximately one-half the distance between the axis of the trunnions and the axis of the connection of the table arm with the link. To obtain any change of radius of cut, it is only necessary to change the length of the arm to double the amount of the required change of radius. In the machine illustrated this is accomplished by substituting an arm of the proper length. This adjustment of the radius allows the machine to be adapted to mill different forms of cutters and for varying the depth of the teeth from the large end to the small end of the blanks.

When a cut has been milled through the length of the pairs of blanks and the milling cutters are at the extreme end of the pairs, the mechanism that imparts the horizontal feed to the slide is automatically tripped, stopping the travel of the slide before the milling cutters cut into and damage the blank arbors. The slide is then returned by the hand wheel to the opposite end of its travel. The hand lever is drawn forward so as to rock the blanks free from the milling cutters and then the blanks are indexed by lifting and lowering the weighted index lever in front. After this the automatic feed is again engaged and the cycle of operations repeated. When all of the teeth have been milled on a set of blanks, the carriage is moved to one side to a position where the finished cutters may be removed without interference by the milling cutters. After uncut blanks are located on the arbors the carriage is moved to bring the blanks beneath the milling cutters.

The movements of the parts are diagrammatically illustrated by Fig. 6, in which figure the line 50 represents the top of the slide which moves horizontally back and forth. The lines 51, 52 and 53 indicate the center lines of the vertical pedestals which are carried horizontally by the slide, and the circles 54, 55 and 56 indicate the three positions of the axes of the trunnions which are supported by the pedestals and which carry the swinging frame to which the table is fastened. The lines 57, 58 and 59 indicate the extreme and intermediate angular positions to which the table is rocked as it is carried forward by the movement of the slide and restrained by the arm, the three positions of which arm are indicated by the lines 60, 61 and 62. As a result of these movements it will be seen that, while the axes of the trunnions move horizontally, the surfaces of the cutters are carried on a curve 63 beneath the cutter 64, and the center of this curve is at the point 65.

With this arrangement the working cut is taken close to the axis of the trunnions where it has but little or no leverage against the constraining mechanism, and thereby a smooth, clean cut is obtained with a minimum strain on the apparatus.

The invention claimed is:—

1. A milling machine having a bed, a slide movably mounted on the bed, means for feeding the slide forward and rearward, a table pivotally mounted on the slide, means for causing the table to rock as the slide and table move back and forth, a blank arbor rotarily mounted on the table, means for indexing the arbor rotarily, frames extending upwardly from the bed, bearings on the frames, a spindle rotarily mounted in said bearings, and a milling cutter fastened to said spindle.

2. A milling machine having a bed, a carriage on the bed, a slide movably mounted on the carriage, means for feeding the slide forward and rearward, a table pivotally mounted on the slide, means for causing the table to rock as the slide and table move back and forth, a blank arbor rotarily mounted on the table, means for indexing the arbor rotarily, frames extending upwardly from the bed, bearings mounted on the frames, a spindle rotarily mounted in said bearings, and a milling cutter fastened to said spindle.

3. A milling machine having a bed, a carriage on the bed, a slide movable forwardly and rearwardly on the carriage, means for feeding the slide forward and rearward, a table pivotally mounted on the slide, means connecting the table and the carriage for causing the table to rock as the slide and table move back and forth, a blank arbor rotarily mounted on the table, means for indexing the arbor rotarily, frames extending upwardly from the bed, bearings mounted in the frames, a spindle rotarily mounted in said bearings, and a milling cutter fastened to said spindle.

4. A milling machine having a bed, a carriage on the bed, a slide movable forwardly and rearwardly on the carriage, means for feeding the slide forward and rearward, a table pivotally mounted on the slide, an arm fastened to the table and pivotally connected with the carriage for causing the table to rock as the slide and table move back and forth, blank arbors rotarily mounted on the table, stationary frames extending upwardly from the bed, adjustable bearings mounted in the frames, a spindle rotarily mounted in said bearings, and milling cutters fastened to said spindle.

5. A milling machine having a bed, a carriage adjustable sidewise on the bed, a slide movable forwardly and rearwardly on the carriage, means for feeding the slide forward and rearward, a table pivotally mounted on the slide, an arm fastened to the table and pivotally connected with the carriage for causing the table to rock as the slide and table move back and forth, a plurality of blank arbors rotarily mounted on the table, bearings mounted on the bed, a spindle rotarily mounted in said bearings, and milling cutters fastened to said spindle.

6. A milling machine having a bed, a slide movably mounted on the bed, means for feeding the slide forward and rearward, a frame pivotally hung on said slide, a table secured to the frame, means for causing the table to rock as the table and frame are carried back and forth by the slide brackets carried by the table, a blank arbor rotarily mounted on the brackets, means for indexing the arbor rotarily, frames extending upwardly from the bed, bearings mounted in the frames, a spindle rotarily mounted in said bearings, and a milling cutter fastened to said spindle.

7. A milling machine having a bed, a carriage on the bed, a slide movable forwardly and rearwardly on the carriage, means for feeding the slide forward and rearward, a frame pivotally hung on said slide, a table secured to the frame, means connecting the table and carriage for causing the table to rock as the table and frame are carried back and forth by the slide, brackets carried by the table, blank arbors rotarily mounted on the brackets, means for indexing the arbors rotarily, stationary frames extending upwardly from the bed, adjustable bearings mounted in the frames, a spindle rotarily mounted in said bearings, and milling cutters fastened to said spindle.

8. A milling machine having a bed, a carriage adjustable sidewise on the bed, a slide movable forwardly and rearwardly on the carriage, means for feeding the slide forward and rearward, a frame pivotally hung on said slide, a table secured to the frame, an arm fastened to the table and pivotally connected with the carriage for causing the table to rock as the table and frame are carried back and forth by the slide, brackets carried by the table, blank arbors rotarily mounted on the brackets, means for indexing the arbors rotarily, stationary frames extending upwardly from the bed, adjustable bearings mounted in the frames, a spindle rotarily mounted in said bearings, and milling cutters fastened to said spindle.

9. A milling machine having a bed, a slide movably mounted on the bed, means for feeding the slide forward and rearward, pedestals mounted on the slide, a frame pivotally supported by said pedestals, a table secured to the frame, means for causing the table to rock as the table, frame and pedestals are carried back and forth by the slide, brackets carried by the table, a blank arbor rotarily mounted on the brackets, means for indexing the arbor rotarily, frames extending upwardly from the bed, bearings mounted in the frames, a spindle rotarily mounted in said bearings, and a milling cutter fastened to said spindle.

10. A milling mahine having a bed, a carriage on the bed, a slide movably mounted on the carriage, means for feeding the slide forward and rearward, pedestals mounted on the slide, a frame pivotally supported by said pedestals, a table secured to the frame, means connecting the table and carriage for causing the table to rock as the table, frame and pedestals are carried back and forth by the slide, brackets carried by the table, a blank arbor rotarily mounted on the brackets, means for indexing the arbor rotarily, frames extending upwardly from the bed, adjustable bearings mounted in the frames, a spindle rotarily mounted in said bearings, and a milling cutter fastened to said spindle.

11. A milling machine having a bed, a carriage adjustable sidewise on the bed, a slide movable forwardly and rearwardly on the carriage, means for feeding the slide forward and rearward, pedestals mounted on the slide, a frame pivotally supported by said pedestals, a table secured to the frame, an arm fastened to the table and pivotally connected with the carriage for causing the table to rock as the table, frame and pedestals are carried back and forth by the slide, brackets carried by the table, a blank arbor rotarily mounted on the brackets, means for indexing the arbor rotarily, stationary frames extending upwardly from the bed, adjustable bearings mounted in the frames, a spindle rotarily mounted in said bearings, and a milling cutter fastened to said spindle.

12. A milling machine having a bed, a carriage adjustable sidewise on the bed, a slide movable forwardly and rearwardly on the carriage, means for feeding the slide forward and rearward, pedestals mounted on the slide, a frame pivotally supported by said pedestals, a table secured to the frame, an arm fastened to the table and pivotally connected with the carriage for causing the table to rock as the table, frame and pedestals are carried back and forth by the slide, brackets carried by the table, a plurality of parallel blank arbors rotarily mounted on the brackets, means for indexing the arbors rotarily, stationary frames extending upwardly from the bed, adjustable bearings mounted in the frames, a spindle rotarily mounted in said bearings, and a plurality of milling cutters spaced the same distance apart as the blank arbors fastened to said spindle.

13. A milling machine having a bed, a slide movably mounted on the bed, means for feeding the slide forward and rearward, pedestals mounted on the slide, trunnions supported by the pedestals, a frame attached to said trunnions, a table secured to the frame, means for causing the table to rock on the trunnions as the table, frame and pedestals are carried back and forth by the slide, brackets carried by the table, a blank arbor rotarily supported by the brackets, means for indexing the arbor rotarily, frames extending upwardly from the bed, bearings mounted in the frames, a spindle rotarily mounted in said bearings, and a milling cutter fastened to said spindle.

14. A milling machine having a bed, a carriage on the bed, a slide movably mounted on the carriage, means for feeding the slide forward and rearward, pedestals mounted on the slide, trunnions supported by the pedestals, a frame attached to said trunnions, a table secured to the frame, means connecting the carriage and table for causing the table to rock on the trunnions as the table, frame and pedestals are carried back and forth by the slide, brackets carried by the table, a blank arbor rotarily supported by the brackets, stationary frames extending upwardly from the bed, bearings mounted in the frames, a spindle rotarily mounted in said bearings, and a milling cutter fastened to said spindle.

15. A milling machine having a bed, a carriage adjustable sidewise on the bed, a slide movable forwardly and rearwardly on the carriage, means for feeding the slide forward and rearward, pedestals mounted on the slide, trunnions supported by the pedestals, a frame attached to said trunnions, a table secured to the frame, an arm fastened to the table and pivotally connected with the carriage for causing the table to rock on the trunnions as the table, frame and pedestals are carried back and forth by the slide, brackets carried by the table, a blank arbor rotarily supported by the brackets, stationary frames extending upwardly from the bed, adjustable bearings mounted in the frames, a spindle rotarily mounted in said bearings, and a milling cutter fastened to said spindle.

16. A milling machine having a bed, a carriage adjustable sidewise on the bed, a slide movable forwardly and rearwardly on the carriage, means for feeding the slide forward and rearward, pedestals mounted on the slide, trunnions supported by the pedestals, a frame attached to said trunnions, a table secured to the frame, an arm fastened to the table and pivotally connected with the carriage for causing the table to rock on the trunnions as the table, frame and pedestals are carried back and forth by the slide, brackets carried by the table, blank arbors rotarily supported by the brackets, means for simultaneously indexing the arbors rotarily, stationary frames extending upwardly from the bed, adjustable bearings mounted in the frames, a spindle rotarily mounted in said bearings, and milling cutters fastened to said spindle.

17. A milling machine having a bed, a slide movably mounted on the bed, automatically operated means for feeding the slide rearward, hand operated means for feeding the slide forward, pedestals mounted on the slide, trunnions supported by the pedestals, a frame attached to said trunnions, a table secured to the frame, means for causing the table to rock on the trunnions as the table, frame and pedestals are carried back and forth by the slide, brackets carried by the table, a blank arbor rotarily supported by the brackets, means for indexing the arbor rotarily, frames extending upwardly from the bed, bearings mounted in the frames, a spindle rotarily mounted in said bearings, and a milling cutter fastened to said spindle.

18. A milling machine having a bed, a carriage on the bed, a slide movably mounted on the carriage, automatically operated means for feeding the slide rearward, hand operated means for feeding the slide forward, pedestals mounted on the slide, trunnions supported by the pedestals, a frame attached to said trunnions, means connecting the frame and the carriage for causing the frame to rock on the trunnions as the frame and pedestals are carried back and forth by the slide, brackets carried by the frame, a blank arbor rotarily supported by the brackets, means for indexing the arbor rotarily, frames extending upwardly from the bed, bearings mounted in the frames, a spindle rotarily mounted in said bearings, and a milling cutter fastened to said spindle.

19. A milling machine having a bed, a carriage adjustable sidewise on the bed, a slide movable forwardly and rearwardly on the carriage, automatically operated means for feeding the slide rearward, hand operated means for feeding the slide forward, pedestals mounted on the slide, trunnions supported by the pedestals, a frame attached to said trunnions, a table secured to the frame, an arm fastened to the table and pivotally connected with the carriage for causing the table to rock on the trunnions as the table, frame and pedestals are carried back and forth by the slide, brackets carried by the table, a blank arbor rotarily supported by the brackets, stationary frames extending upwardly from the bed, adjustable bearings mounted in the frames, a spindle rotarily mounted in said bearings, and a milling cutter fastened to said spindle.

20. A milling machine having a bed, a carriage adjustable sidewise on the bed, a slide movable forwardly and rearwardly on the carriage, automatically operated means for feeding the slide rearward, hand operated means for feeding the slide forward, pedestals mounted on the slide, trunnions supported by the pedestals, a frame attached to said trunnions, a table secured to the frame, an arm fastened to the table and pivotally connected with the carriage for causing the table to rock on the trunnions as the table, frame and pedestals are carried back and forth by the slide, brackets carried by the table, blank arbors rotarily supported by the brackets, means for simultaneously indexing the arbors rotarily, stationary frames extending upwardly from the bed, adjustable bearings mounted in the frames, a spindle rotarily mounted in said bearings, and milling cutters fastened to said spindle.

21. A milling machine having a bed, a slide movably mounted on the bed, automatically operated means for feeding the slide rearward, mechanism for tripping said automatic feed, hand operated means for feeding the slide forward, pedestals mounted on the slide, trunnions supported by the pedestals, a frame attached to said trunnions, a table secured to the frame, means for causing the table to rock on the trunnions as the table, frame and pedestals are carried back and forth by the slide, brackets carried by the table, a blank arbor rotarily supported by the brackets, means for indexing the arbor rotarily, frames extending upwardly from the bed, adjustable bearings mounted in the frames, a spindle rotarily mounted in said bearings, and a milling cutter fastened to said spindle.

22. In a milling machine, a spindle having a milling cutter, a tiltable table movable back and forth beneath said cutter, means actuated by the movement of the table for tilting the table up and down, toward and from the cutter as it is moved back and forth, and blank arbors mounted on said table.

23. In a milling machine, a cutter spindle, a blank arbor movably hung at right angles to the cutter spindle, and means supporting said arbor so that it will swing longitudinally on the arc of a circle beneath the spindle.

24. A milling machine having a bed, a carriage on the bed, a slide movably mounted on the bed, means for feeding the slide forward and rearward, a table pivotally mounted on the slide, an arm fastened to the table and pivotally connected with the carriage for causing the table to rock as the slide and table move back and forth, a blank arbor rotarily mounted on the table, means for indexing the arbor rotarily, frames extending upwardly from the bed, bearings on the frames, and a cutter spindle rotarily mounted in said bearings, and a milling cutter fastened to said spindle.

25. A milling machine having a bed, a carriage on the bed, a slide movable forwardly and rearwardly on the carriage, means for feeding the slide forward and rearward, a table pivotally mounted on the slide, an arm fastened to the table and pivotally connected with the carriage for causing the table to rock as the slide and table move back and forth, blank arbors rotarily mounted on the table, means for indexing the arbors rotarily, frames extending upwardly from the bed, adjustable bearings mounted in the frames, and a cutter spindle rotarily mounted in said bearings.

26. In a milling machine a bed, a milling cutter spindle rotarily mounted on the bed, a carriage movable on the bed longitudinally of the cutter spindle, a slide mounted on the carriage and movable thereon transversely of the cutter spindle, an oscillatory frame hung on the slide, a blank arbor mounted on the frame and extending at right angles to the cutter spindle, and means connecting the frame and the carriage whereby the reciprocation of the slide on the carriage oscillates the frame and blank arbor.

PHILIP J. DARLINGTON.